(12) United States Patent
Umezaki (10) Patent No.: US 7,883,414 B2
(45) Date of Patent: Feb. 8, 2011

(54) BATTLE SYSTEM

(75) Inventor: Shirou Umezaki, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 52 days.

(21) Appl. No.: 12/137,879

(22) Filed: Jun. 12, 2008

(65) Prior Publication Data

US 2008/0248869 A1    Oct. 9, 2008

Related U.S. Application Data

(63) Continuation of application No. 10/938,710, filed on Sep. 10, 2004, now Pat. No. 7,470,193.

(51) Int. Cl.
*A63F 13/00* (2006.01)

(52) U.S. Cl. .......................... 463/30; 463/31

(58) Field of Classification Search ............ 463/2, 463/8, 16–17, 20, 30–34, 40–44; 273/236–237, 273/148 B, 148 R; 700/91; 340/323 R
See application file for complete search history.

(56) References Cited

U.S. PATENT DOCUMENTS

| | | | | |
|---|---|---|---|---|
| 5,788,573 | A | * | 8/1998 | Baerlocher et al. ............ 463/16 |
| 6,354,940 | B1 | | 3/2002 | Itou et al. ..................... 463/8 |
| 6,533,663 | B1 | | 3/2003 | Iwao et al. ..................... 463/32 |
| 6,729,954 | B2 | | 5/2004 | Atsumi et al. ................. 463/7 |
| 6,769,988 | B1 | | 8/2004 | Sato et al. ..................... 463/38 |
| 6,932,708 | B2 | | 8/2005 | Yamashita et al. ........... 463/42 |
| 7,008,324 | B1 | * | 3/2006 | Johnson et al. ............... 463/42 |
| 2002/0090114 | A1 | | 7/2002 | Rhoads et al. ................ 382/100 |
| 2003/0119581 | A1 | * | 6/2003 | Cannon et al. ................ 463/25 |
| 2004/0259636 | A1 | | 12/2004 | Machida ....................... 463/30 |

OTHER PUBLICATIONS

Playstation, Grandia, 1999: http:IIdownloads.planetmirror.comIpub/replacementdocsIGrandia—Manual_- PSX.pdf.*

* cited by examiner

*Primary Examiner*—Dmitry Suhol
*Assistant Examiner*—Damon Pierce
(74) *Attorney, Agent, or Firm*—Frommer Lawrence & Haug LLP; William S. Frommer (57) ABSTRACT

Methods and apparatus for presenting information in a video game. In one implementation, an entertainment system includes: a game console; a display device connected to said game console; and a video game application program; wherein when said game console executes said video game application program, said game console causes said display device to display an information gauge; wherein said information gauge includes: an action bar having a start end and a goal end, and a plurality of character icons presented at respective points on the action bar, each character icon representing a respective character in the video game; wherein said character icons move along said action bar over time in the direction from said start end to said goal end; and wherein when a character icon reaches said goal end, the character corresponding to that character icon has an opportunity to perform an action in the video game.

5 Claims, 7 Drawing Sheets

BATTLE SYSTEM

This is a continuation of application Ser. No. 10/938,710 filed Sep. 10, 2004, now U.S. Pat. No. 7,470,193 the entirety of which is incorporated herein by reference.

BACKGROUND

In many video games played through game consoles, such as role-playing games (RPG's), a user or player controls the actions of one or more characters in the game throughout various events and situations. A common game situation is a battle between the player's characters (or players') and enemy characters. The video game provides a battle system for presenting information to the player and controlling the characters during battle. In a typical battle system, the video game displays for each character a corresponding bar that gradually fills over time. When the bar is full, the corresponding character can take some action. When the player is controlling several characters, keeping track of multiple action bars can become confusing and frustrating for the player. Furthermore, keeping track of the enemy action bars at the same time can be more confusing. As a result, coordinating the actions of characters can be difficult.

SUMMARY

The present invention provides methods and apparatus for presenting information in a video game. In one implementation, an entertainment system includes: a game console; a display device connected to said game console; and a video game application program; wherein when said game console executes said video game application program, said game console causes said display device to display an information gauge; wherein said information gauge includes: an action bar having a start end and a goal end, and a plurality of character icons presented at respective points on the action bar, each character icon representing a respective character in the video game; wherein said character icons move along said action bar over time in the direction from said start end to said goal end; and wherein when a character icon reaches said goal end, the character corresponding to that character icon has an opportunity to perform an action in the video game.

In another implementation, an information gauge in a video game includes: an action bar having a start end and a goal end; and a plurality of character icons presented at respective points on the action bar, each character icon representing a respective character in the video game; wherein said action bar and said character icons are graphical elements displayed on a display device while the video game is being played, said character icons move along said action bar over time in the direction from said start end to said goal end, and when a character icon reaches said goal end, the character corresponding to that character icon has an opportunity to perform an action in the video game.

In another implementation, an information gauge in a video game includes: a bonus area; and a plurality of bonus icons presented in a row ending at said bonus area, each bonus icon representing a type of bonus; wherein said bonus area and said bonus icons are graphical elements displayed on a display device while the video game is being played, said bonus icons move towards said bonus area over time and enter said bonus area one at a time, and when an event concludes, a player in the video game receives a bonus corresponding to a bonus icon currently in said bonus area.

In another implementation, a method of displaying information on a display device while executing a video game includes: displaying an action bar having a start end and a goal end; displaying a plurality of character icons at said start end, each character icon representing a respective character in the video game; moving each character icon along said action bar towards said goal end; and performing an action for a character in the video game when the character icon corresponding to that character reaches said goal end.

In another implementation, a method of displaying information on a display device while executing a video game includes: displaying a bonus area; displaying a plurality of bonus icons in a row ending at said bonus area, each bonus icon representing a type of bonus; moving said bonus icons towards said bonus area so that said bonus icons enter said bonus area one at a time; and providing a player in the video game a bonus corresponding to a bonus icon currently in said bonus area when an event concludes.

DETAILED DESCRIPTION

The present invention provides methods and apparatus for presenting information in a video game. In one implementation, a video game executing as a software application on a video game console provides a battle system including an information gauge. The video game presents the information gauge on the screen during a battle in the game. The information gauge provides information for multiple characters on a single bar using multiple icons. Each character is represented by a respective icon. The icons are initially placed at one end of the gauge. As time progresses, the icons move along the gauge. When an icon reaches the end of the gauge, the corresponding character can act in the game.

Several illustrative examples in one implementation are presented below. These examples are not exhaustive and additional examples and variations are also described later.

In one example, an RPG video game is implemented as a software program stored on removable media inserted into a game console, such as a PlayStation2™ offered by Sony Computer Entertainment Inc. The game console executes the RPG software so that a user (or users) of the console can play the RPG using a game controller of the console and viewing the game through a connected display (e.g., a television).

In the RPG, the player (or each player) controls one or a group of characters. The RPG provides a battle system using a global active gauge. When the player's characters begin a battle with enemy computer-controlled characters, the RPG presents a battle screen showing the player and enemy characters in a location in the game. The RPG also presents a global active gauge as an information gauge in the battle screen. The RPG presents the global active gauge in one corner of the display screen, as an overlay on the depicted scene. The global active gauge includes two sections: a character section and a bonus section. The character section provides information on when the characters in the battle will act. The bonus section provides information on which bonuses are available and the timing of bonuses in the current battle.

The character section includes a horizontal bar. One end of the bar is the "start" and the other end is the "goal". The bar is tapered so that the goal end is wider than the start end. Color coding can also be used to differentiate the start from the goal (e.g., gradually lightening color in the bar from the start to the goal end). The bar includes regular demarcations, such as at one-quarter, one-half, and three-quarters.

The RPG presents an icon in the character section for each character in the battle. The position of an icon indicates when the corresponding character can act. For each character, the RPG places an icon below the bar at the start end with a corresponding indicator above the icon in the bar, such as an arrow or line (for increased detail in relative position). As time progresses in the battle, the icons and indicators for the characters move along the bar towards the goal end. When an icon reaches the goal end of the bar, the RPG allows the player to select an action for the corresponding character (or the RPG selects an action for a computer-controlled character) and causes the selected action to be performed (requesting additional information as appropriate, such as a target).

The icons for different characters move at respective rates depending on the speed of the characters. For example, a "fast" character that can act quickly or often has an icon that moves along the bar more rapidly than the icon for a slower character. Certain events in the game or actions taken by characters can cause the rates of movement or position of icons to change. For example, some actions may be determined to take longer than others. In that case, when a character has performed a short or quick action, the RPG positions the icon for the character farther along the bar rather than placing the icon back at the start end, so that the character can take another action more quickly. In another example, negative effects applied to a character, such as a "slow" or "stop" effect, can cause the movement of the character's icon to change (e.g., temporarily stop advancing). In another implementation, the player (or computer) selects an action (or type of action) for a character first and then the RPG controls the positioning and movement of the character's icon accordingly (e.g., selecting a slow action causes the icon to move more slowly). When the icon reaches the goal end of the bar, the RPG causes the selected action to be performed (requesting additional information as appropriate, such as a target).

The bonus section includes a bonus circle above the character section. At the start of the battle the RPG places a series of bonus icons in a horizontal row leading to the bonus circle and above the bar of the character section. Each bonus icon represents a bonus that the player can receive if the enemy characters are defeated quickly enough, such as money, items, weapons, and so on. As time progresses the bonus icons move towards the bonus circle. The bonus icons move at different rates depending on the type of battle, moving more slowly for more important or difficult battles (e.g., "boss" battles). When a bonus icon enters the bonus circle, the bonus icon remains in the bonus circle until the next bonus icon reaches the bonus circle. When the next bonus icon reaches the bonus circle, the bonus icon changes to the newly arrived bonus icon and the previous bonus icon is lost. When the battle ends, if the player characters have won, the player receives a bonus for each bonus icon remaining in the bonus section. In another implementation, the player receives a single bonus corresponding to the bonus icon in the bonus circle. The earlier bonus icons correspond to bonuses that are generally better or more desirable than the later bonus icons so that the player has an incentive to finish the battle quickly to receive better bonuses.

Using the character section, a player can advantageously plan strategy for how to handle enemy characters. For example, the player can plan which enemy to attack and how (e.g., using special items or abilities, or timing the use of a "charge" attack that may require a longer preparation time). The icons in the character section show the relative timing of upcoming actions, with characters that will act sooner shown closer to the goal end of the bar. Accordingly, a player can determine which enemy will act next and also approximately how long before another character will act. By placing the icons for the characters in one gauge, it is easy for a player to quickly see and plan the timing of actions.

Using the bonus section, a player can advantageously plan actions according to what bonuses are shown. By seeing what bonuses remain, the player can decide whether to finish the battle quickly or slowly, and so whether to use an aggressive or conservative strategy (e.g., taking more risks, or conserving resources).

Using the two sections together, a player can create a strategy that achieves both goals of defeating the enemy characters and obtaining the desired bonuses. Each of the sections independently or in conjunction can enhance the player's enjoyment of the game experience and so provide a better entertainment product.

Figure 1:
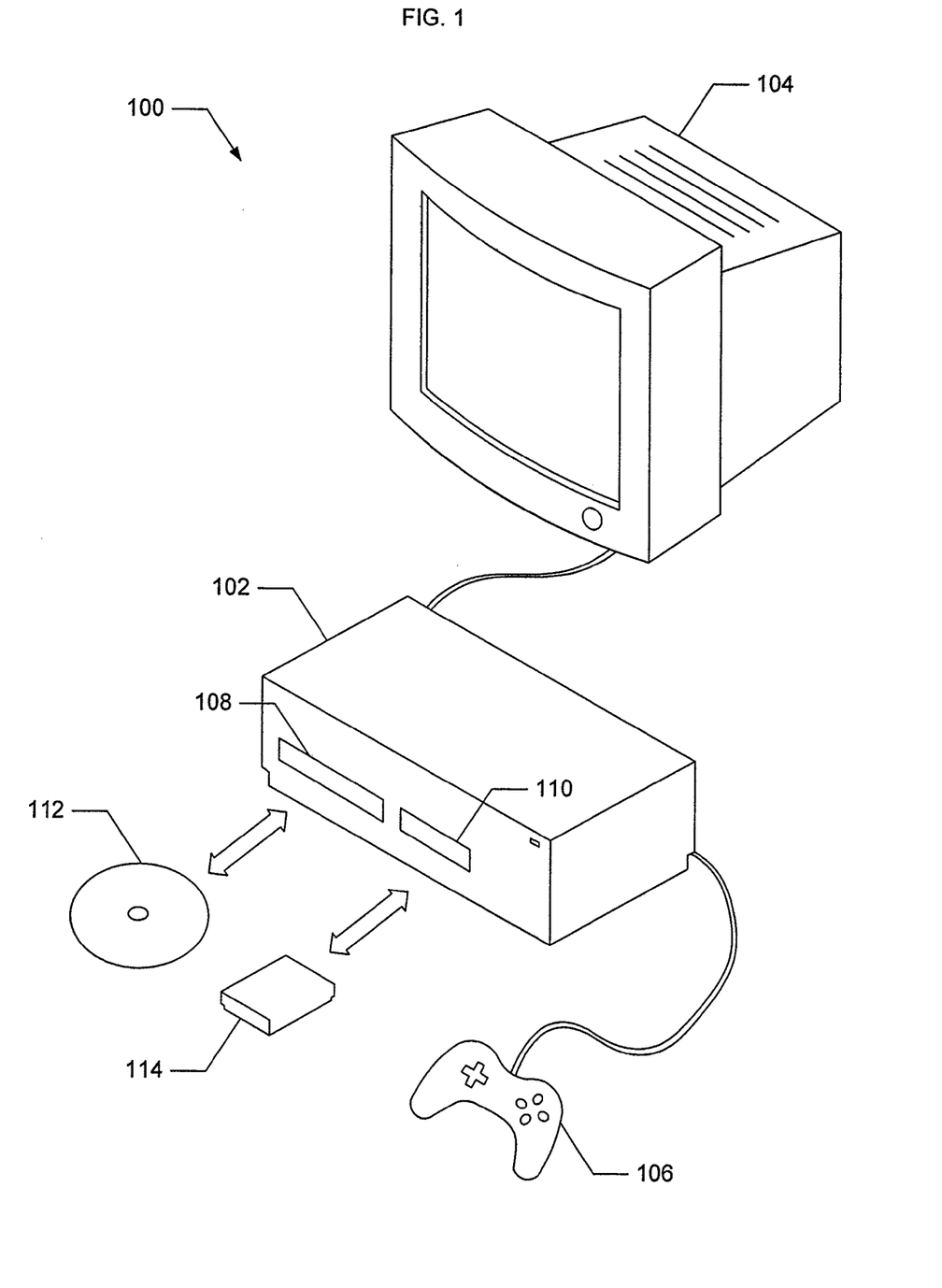
FIG. 1 shows one implementation of an entertainment system including a game console connected to a display device.

FIG. 1 shows one implementation of an entertainment system 100 including a game console 102, such as a PlayStation2™, connected to a display device 104, such as a television. The game console 102 is a computing device that executes software application programs and causes images to be displayed on the display device 104 by providing video signals to the display device 104. The console 102 can also present audio by providing audio signals to the display device 104 or to an audio system (not shown).

The game console 102 includes a game controller 106, a media reader 108, and a memory port 110. The controller 106 accepts user input and commands, such as joystick and button manipulations. The media reader 108 accepts an article of removable media 112 (e.g., a CD-ROM, DVD, or other optical disc) storing information (e.g., data, executable application programs, or media), and reads the stored information. The console 102 uses the retrieved information. The memory port 110 accepts a removable memory device 114 storing data, such as a flash memory card. Through the memory port 110, the console 102 retrieves data from the memory device 114 and stores data to the memory device 114.

In one example of use, the game console 102 reads a video game application program from an optical disc 112 inserted into the media reader 108 and reads stored data from a memory card 114 inserted into the memory port 110. The game console 102 executes the game program and presents the corresponding video game through the connected television 104. The game console 102 generates video data and corresponding video signals to present screen images to a player through the connected display device 104. When the game console 102 executes a video game program providing an information gauge, the game console 102 causes the display device 104 to display a screen image including an information gauge at appropriate times. The game console 102 accepts user input and commands from a player through the game controller 106 and executes the game program accordingly.

In another implementation, the game console includes or is connected to a network adapter. The network adapter is connected to a network, such as the Internet (e.g., through a broadband modem such as a cable modem). The game console downloads and stores data through the network adapter. The game console includes data storage, such as a hard disk, and stores the downloaded data in the data storage. In one example of use, the game console downloads a video game application program from a server computer through the Internet. The game console reads the video game application program from the data storage and executes the game program and presents the corresponding video game through a connected television.

Figure 2:
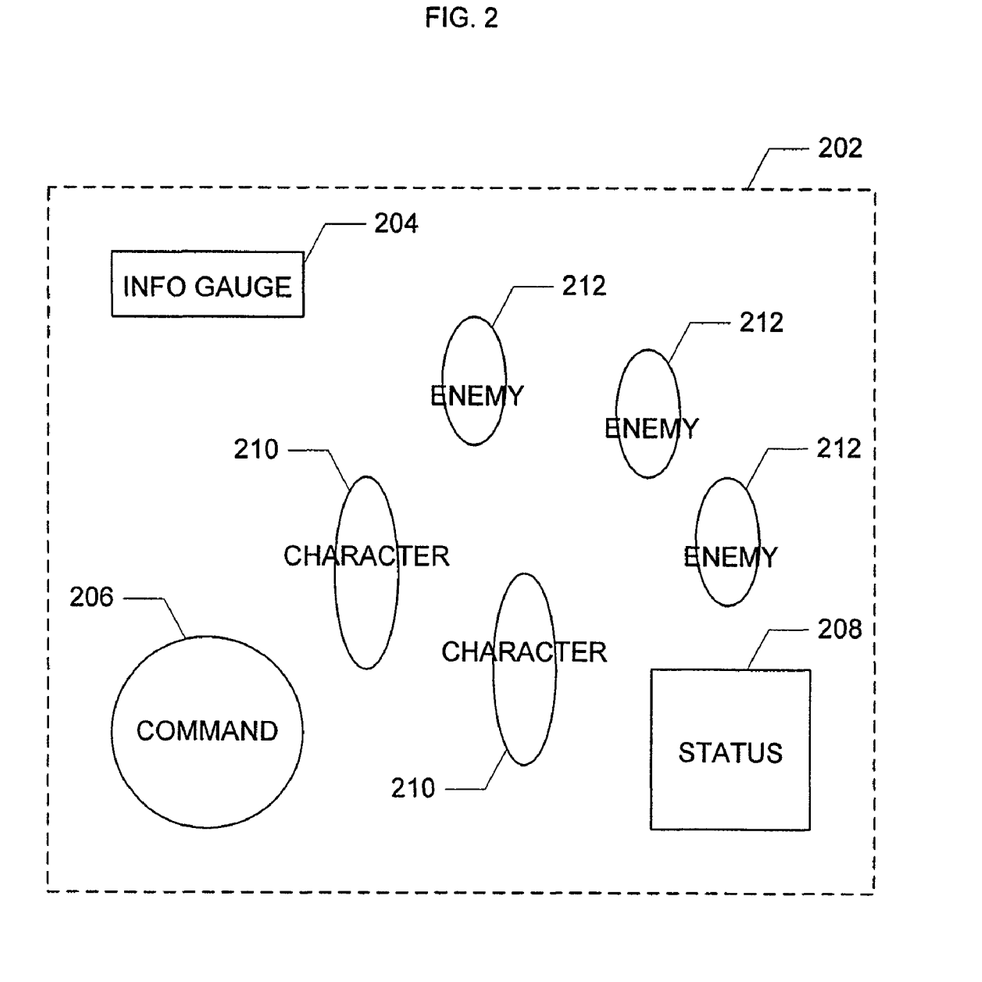
FIG. 2 shows a representation of one implementation of a screen image presented in a video game by a game console executing a video game program supporting an information gauge.

FIG. 2 shows a representation of one implementation of a screen image 202 presented in a video game by a game console executing a video game program supporting an information gauge, such as in the entertainment system 100 shown in FIG. 1. The screen image 202 is presented during a battle event in the video game and includes an information gauge 204, a command interface 206, a status interface 208, two player characters 210, and three enemy characters 212. The information gauge 204 presents a graphical representation of when characters in the battle will act and what bonuses are available. The command interface 206 shows available commands and provides selection of commands by the player. The status interface 208 shows status information for characters in the battle event (e.g., health, abilities, magic power, and so on). The player characters 210 and enemy characters 212 represent the characters in the battle event and are animated according to events and actions that occur in the battle.

Figure 3:
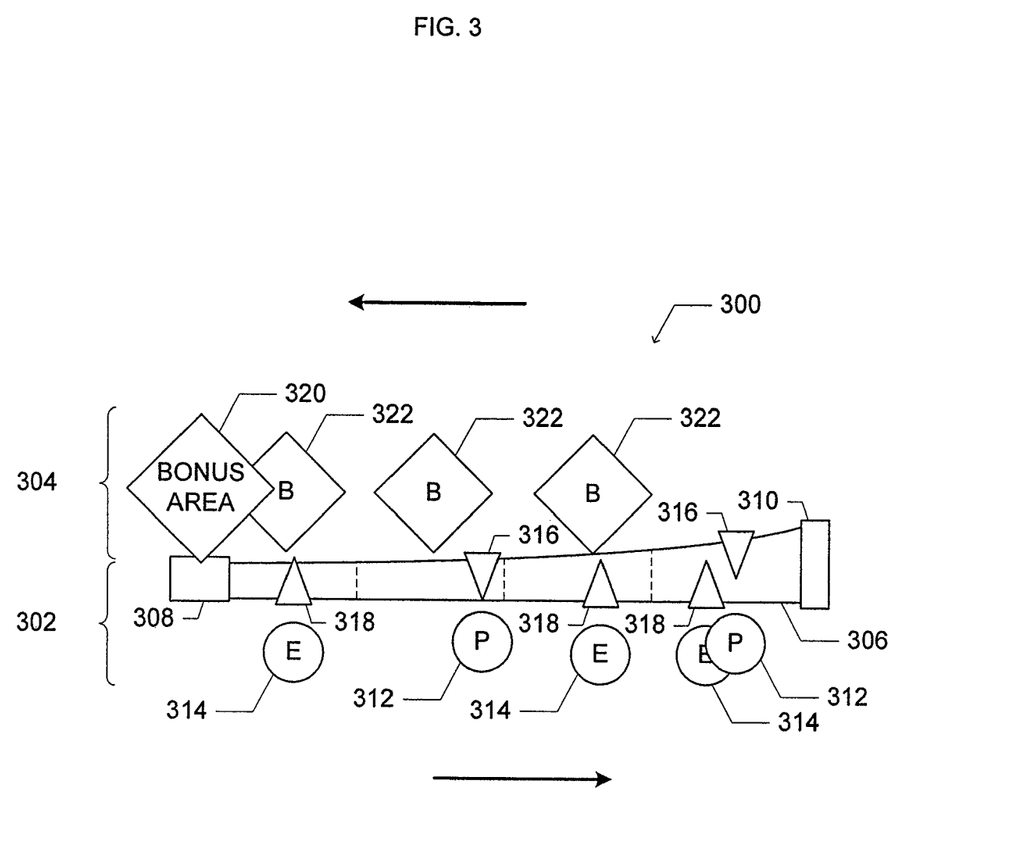
FIG. 3 shows a representation of one implementation of an information gauge.

FIG. 3 shows a representation of one implementation of an information gauge 300, such as for the information gauge shown in FIG. 2. The information gauge 300 is generated by a game console for display on a display device using data for a battle occurring in a video game executing on the game console. The information gauge 300 presents information regarding the battle in the video game so that a player (or players in a multi-player game) can easily see time-related information in a unified interface. In one implementation, the information gauge 300 implements a version of the global active gauge described above. The information gauge 300 includes a character section 302 and a bonus section 304.

The character section 302 includes an action bar 306. The action bar 306 has a start end 308 and a goal end 310. The action bar 306 includes regular demarcations, shown as dashed lines in FIG. 3. The game console places player character icons 312 and enemy character icons 314 below the action bar 306. The position of an icon along the action bar 306 indicates the current relative order of action for the character corresponding to the icon. The game console presents the player character icons 312 differently from the enemy character icons 314 to differentiate the two types of icons. Player character icons 312 are positioned higher than and on top of enemy character icons 314 to help distinguish the player character icons 312. Each character icon includes a small image representing the character, such as a thumbnail portrait. In another implementation, the character icons are labeled with symbols or text or are color-coded to indicate the corresponding character (e.g., labeled with the name of the character) or type of character (e.g., player character icons are blue and enemy character icons are red). In one implementation, the game console changes the character icons according to events that occur in battle, such as shading an icon green when the corresponding character has been poisoned.

For each of the character icons, the game console also places a player bar indicator 316 or enemy bar indicator 318 on top of the action bar 306 at a position corresponding to the character icon to help to indicate in more detail the relative positions of the character icons. The bar indicators are also different for player characters and enemy characters. The player bar indicators 316 point downward and the enemy bar indicators 318 point upwards to distinguish the indicators. The bar indicators are also color-coded (e.g., blue for player characters and red for enemy characters). In another implementation, the bar indicators are left out. In another implementation, the character icons are left out and only the bar indicators are provided.

Initially, at the beginning of a battle, the game console places character icons at the start end 308. Under special circumstances the game console places character icons closer along the action bar 306 to the goal end 310, such as in an ambush where some characters are allowed to act earlier than others. As time progresses in the battle, the game console causes the character icons to move along the action bar 306 toward the goal end 310. In one implementation, the game console moves the character icons at respective rates according to the attributes of the corresponding characters (e.g., faster characters can act more often and so their character icons move more quickly toward the goal). When a character icon reaches the goal end 310, the corresponding character has the opportunity to act. For a player character, the game console requests an action selection from the player, such as through a command interface. For an enemy character (controlled by the game console), the game console selects an action. Example of actions include, but are not limited to: attack, defend, pass, use magic, use an ability, use an item, talk, and run. A player can elect to wait to select an action. While a player is waiting, the character icon remains at the goal end 310 of the action bar 306. For example, a player may want two characters to act at the same time or in a specific order. By viewing where the character icons are on the action bar 306, the player can see when characters will be able to act.

In one implementation, the game console highlights character icons as the characters are selected. The game console highlights (e.g., changes color, brightens, changes size, or causes to blink) the character icon for a currently selected character (e.g., for the player character that the player is currently controlling). Similarly, the game console highlights the character icon for a character selected as a target for an action. For example, when a player selects an enemy character to attack, the enemy character icon 314 corresponding to the selected enemy character is highlighted. This visual indication of a selected target in the information gauge 300 shows the selected target in a time context and helps a player to determine which enemy to attack (e.g., to attack the enemy that will act next) or which player character to aid (e.g., heal damage).

In one implementation, a player can select a "charge" attack or action. When the charge attack is first selected a charge period begins and the charge attack builds power (while charging, the character icon remains at the goal end 310 of the action bar 306). When the player instructs the character to attack, the character executes the charge attack and the power of the attack is based on how long the charge period continued. By observing the position of an enemy character icon on the action bar 306, a player can time how long to continue the charge period. For example, a player can begin the charge period and wait until just before the enemy character icon reaches the goal end 310 of the action bar 306 to release the charge attack.

The bonus section 304 includes a bonus area 320. The bonus area 320 is positioned above the action bar 306 near the start end 308. The game console positions one or more bonus icons 322 in a row above the action bar 306. A bonus icon 322 represents a bonus that a player can receive at the end of the battle event. Each bonus icon 322 includes a small image representing the type of corresponding bonus (e.g., a coin for money). In another implementation, the bonus icons are labeled with symbols or text or are color-coded to indicate the corresponding bonus.

Initially, at the beginning of a battle, the game console places one or more bonus icons 322 above the action bar 306 in a row leading to the bonus area 320. The game console selects the bonus icons 322 to display based on the enemy characters in the battle. In another implementation, the game console uses other factors (such as time or location) to select bonus icons, pseudo-randomly selects bonus icons, or always uses the same bonus icons. As time progresses in the battle, the game console causes the bonus icons 322 to move along the action bar 306 toward the bonus area 320. The bonus icons move in the opposite direction from that of the character icons (e.g., the bonus icons move right to left and the character icons move left to right). The game console moves the bonus icons 322 at a rate depending on the circumstances of the battle event, such as moving bonus icons more slowly for an important or difficult battle. When a bonus icon 322 reaches the bonus area 320, the game console causes the bonus area 320 to display a symbol or image representing that bonus icon 322. When the next bonus icon 322 reaches the bonus area 320, the game console updates the bonus area 320 according to the newly arrived bonus icon 322. Under special circumstances, the game console adds new bonus icons 322 to the bonus section 304, such as when a character uses an appropriate special ability or magic.

When the battle ends and the player has won (e.g., a player character is still active or alive after all the enemy characters are defeated), the player receives a bonus for the bonus icon in the bonus area 320 (represented by the image shown on the bonus area 320) and for each of the bonus icons 322 that remain in the bonus section 304 (i.e., the bonus icons 322 that have not yet reached the bonus area 320). The player does not receive a bonus for bonus icons 322 that reached the bonus area 320 and were replaced by a subsequently arriving bonus icon 322. Accordingly, the more quickly the battle ends, the more bonuses the player will receive. For each bonus, the game console determines the specific bonus according to the type of bonus icon and the circumstances of the battle. For example, for a money bonus icon, the game console determines a specific amount of money based on the difficulty of the defeated enemy characters. In one implementation, the game console selects a specific bonus from a group of subtypes of bonuses corresponding to the bonus icon. For example, for a magic item bonus icon, the game console selects a type of magic item according to the type of enemy character defeated or the location of the battle in the game world, and then pseudo-randomly selects a specific item of that type.

In another implementation, the player receives a single bonus corresponding to the bonus icon 322 in the bonus area 320. In another implementation, the bonus icons 322 move into the bonus area 320 and when a bonus icon 322 has fully entered the bonus area 320 the bonus icon 322 disappears and the bonus is lost. In this case, the player again receives bonuses for the bonus icons 322 still displayed in the bonus section 304 at the end of the battle.

By viewing which bonus icons 322 remain, the player can plan how to approach a battle. If the player wants to obtain a particular bonus, the player can select actions to attempt to end the battle more quickly, such as by taking more aggressive or risky actions. On the other hand, if the player is less interested in receiving a bonus, the player can select more conservative actions (e.g., conserving resources or avoiding risks).

By coordinating the two sets of information presented in the information gauge 300, the player can develop a strategy that meets the player's goals. In this way the player's enjoyment of the game experience can be enhanced.

Figure 4:
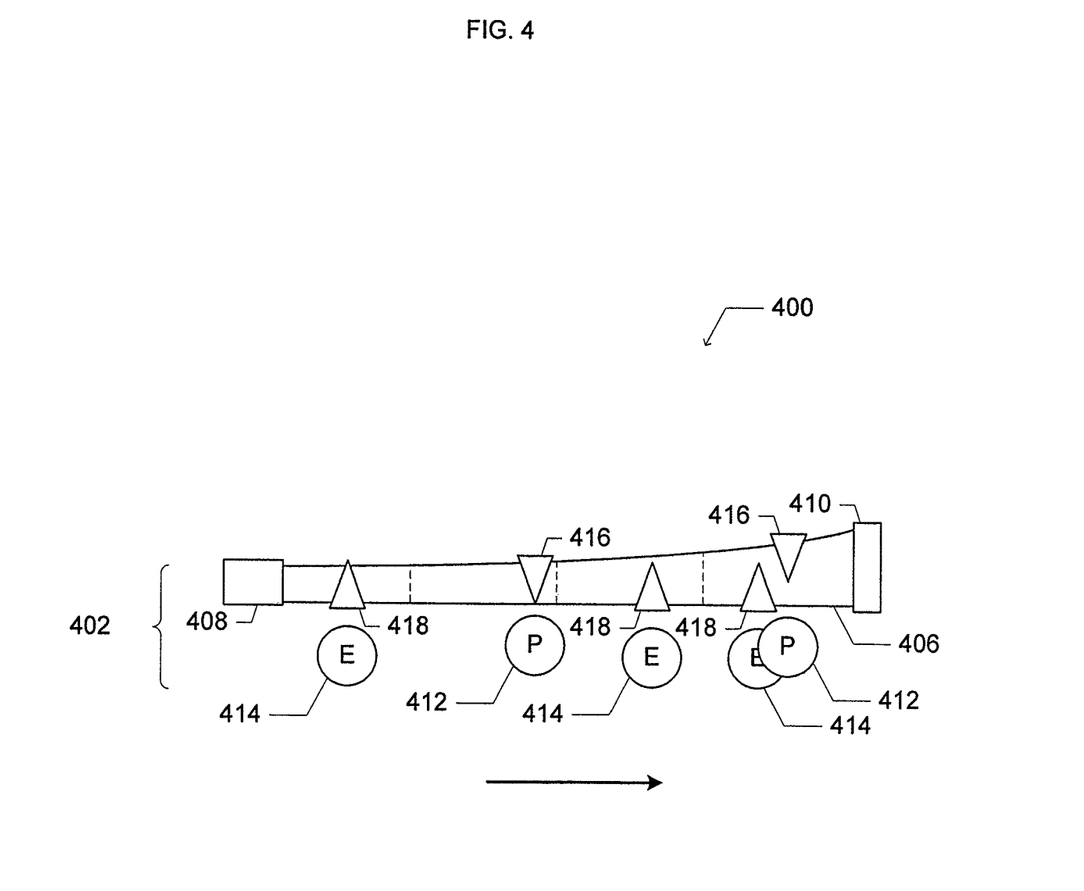
FIG. 4 shows a representation of one implementation of an information gauge that includes only a character section.
Figure 5:
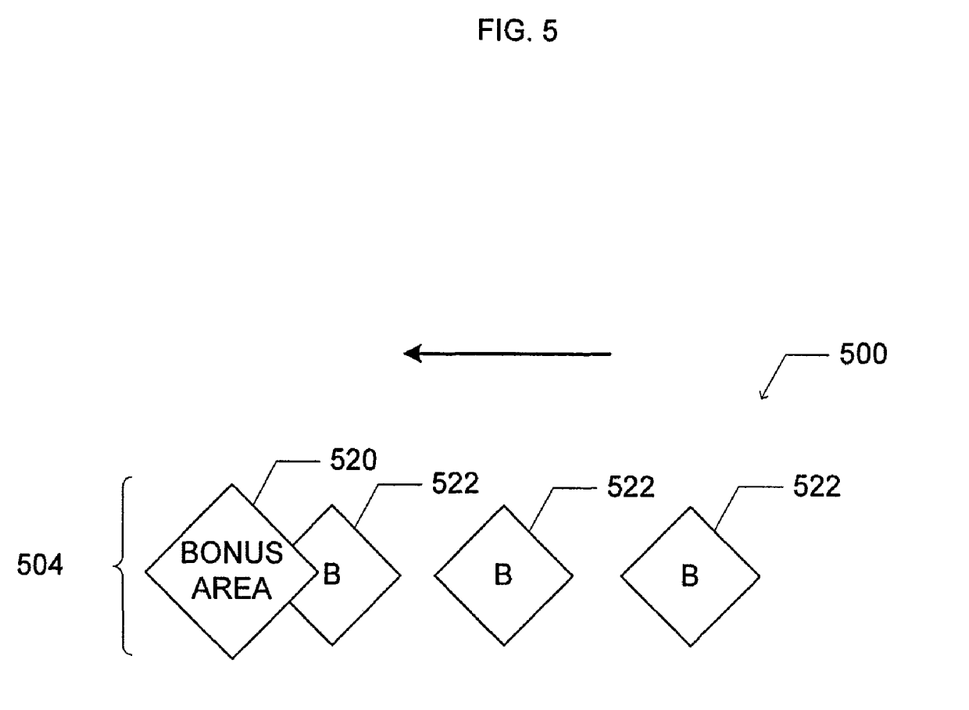
FIG. 5 shows a representation of one implementation of an information gauge that includes only a bonus section.

In an alternative implementation, the character section and the bonus section are displayed separately as two different information gauges. Alternatively, only one of the information gauges is used. FIG. 4 shows a representation of one implementation of an information gauge 400 that includes only a character section 402. FIG. 5 shows a representation of one implementation of an information gauge that includes only a bonus section 504.

Figure 6:
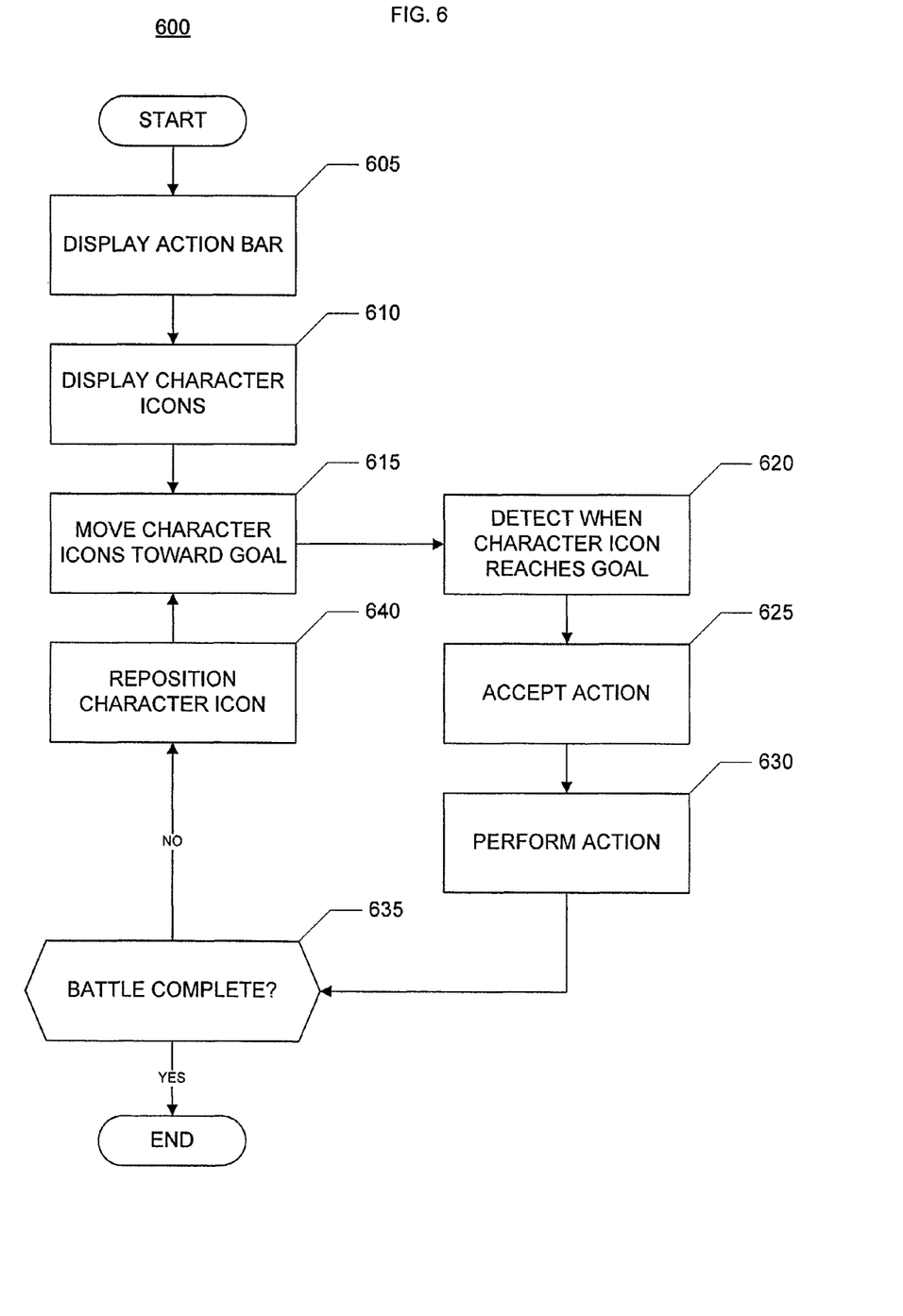
FIG. 6 shows a flowchart of one implementation of displaying character action information using an information gauge.

FIG. 6 shows a flowchart 600 of one implementation of displaying character action information using an information gauge. Initially, a game console is executing a video game application program read from removable media inserted into the game console (such as in the entertainment system shown in FIG. 1). The game console causes a connected display device to display images reflecting the video game. The game console is also connected to a game controller for accepting user input and commands. In the course of executing the video game program, the game console has determined that a battle is to occur in the video game and initiates a battle sequence, displaying a battle screen.

The game console displays an action bar, block 605. The game console generates the video data and corresponding video signals to cause the display device to display the action bar. The action bar has a start end and a goal end. In one implementation, the game console displays the action bar shown in FIG. 3.

The game console displays character icons for the player characters and enemy characters in the battle, block 610. The game console places the character icons at the start end of the action bar and displays (through the display device) the icons. Alternatively, one or more character icons are placed farther along the action bar. In one implementation, the game console displays the character icons as shown in FIG. 3. The battle begins.

As time progresses in the battle, the game console moves the character icons along the action bar toward the goal end of the action bar, block 615. As described above, the game console moves the character icons at respective rates according to the attributes of the corresponding characters (two or more of the rates can be the same). Alternatively, all the character icons move at the same rate.

The game console detects when a character icon has reached the goal end of the action bar, block 620. The game console uses position information to detect the character icon reaching the goal end of the action bar.

The game console accepts a selection of an action to perform for the character corresponding to the character icon that reached the goal end, block 625. For a user-controlled character, the game console requests and accepts a selection through a graphical command interface and user input through the game controller connected to the game console. For an enemy character or other computer-controlled character, the game console selects and accepts an action to perform.

The game console performs the selected action in the video game, block 630. After performing the action and applying the effect of the action, the game console detects whether the battle is complete or not, block 635. The battle ends when all of the enemy characters (or all of the player characters) are defeated.

If the battle is not complete, the game console repositions the character icon, placing the character icon for the character back at the start end of the action bar, block 640. In one implementation, the game console places character icons back at the same position after performing actions. In another implementation, the game console places character icons at different positions depending on circumstances in the battle or the action the character has just completed. For example, after performing an easy or quick action (one that would require a short amount of time), the game console places the character icon closer to the goal end of the action bar so that the character does not wait as long before being able to act again.

The game console continues to move character icons along the action bar, returning to block 615, and perform actions as described above until the end of the battle. In one implementation, when the battle is complete, the game console provides a bonus (or more) to the player based on a bonus section of the information gauge.

Figure 7:
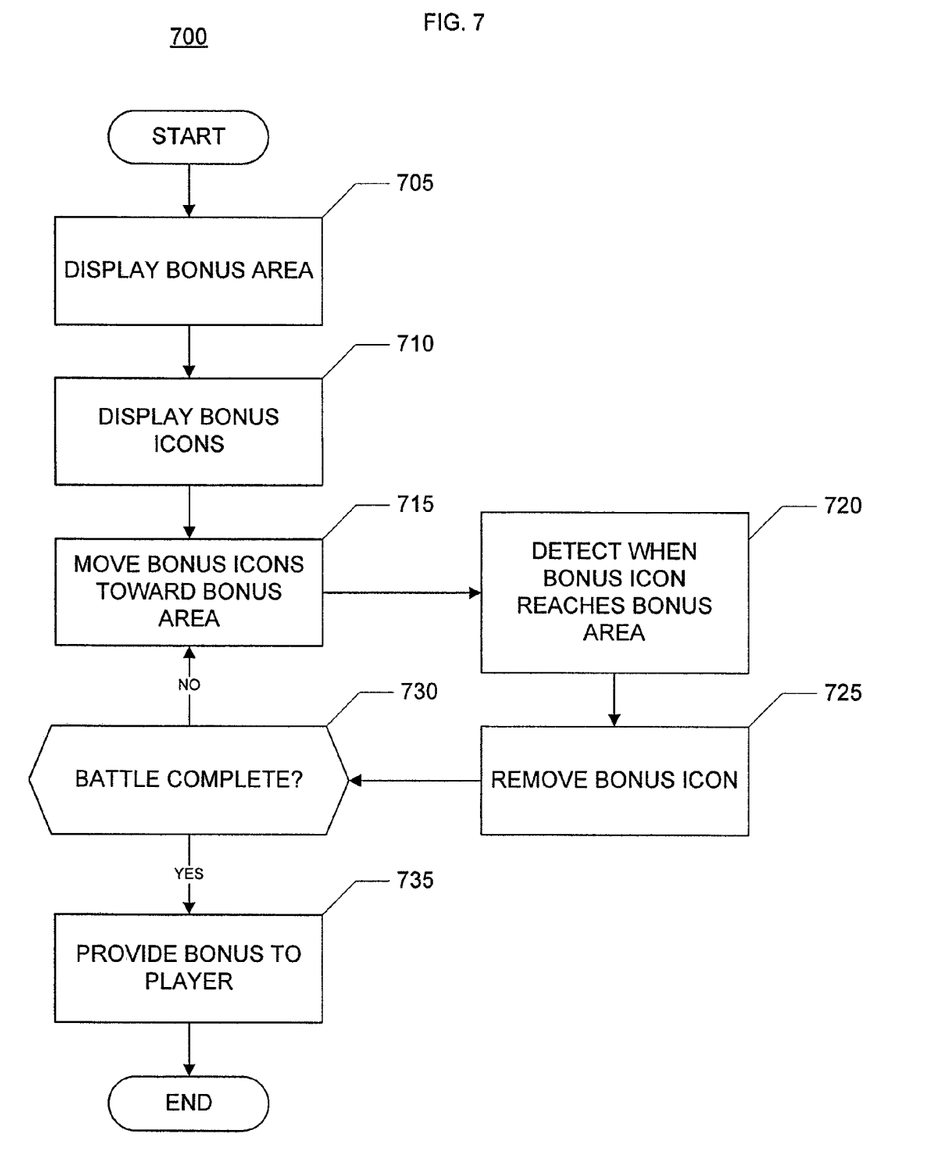
FIG. 7 shows a flowchart of one implementation of displaying bonus information using an information gauge.

FIG. 7 shows a flowchart 700 of one implementation of displaying bonus information using an information gauge. Initially, a game console is executing a video game application program read from removable media inserted into the game console (such as in the entertainment system shown in FIG. 1). The game console causes a connected display device to display images reflecting the video game. The game console is also connected to a game controller for accepting user input and commands. In the course of executing the video game program, the game console has determined that a battle is to occur in the video game and initiates a battle sequence, displaying a battle screen.

The game console displays a bonus area, block 705. The game console generates the video data and corresponding video signals to cause the display device to display the bonus area. The bonus area is a defined area or location in the battle screen image (e.g., a circle or line). In one implementation, the game console displays the bonus area above an action bar, as shown in FIG. 3.

The game console displays bonus icons for bonuses available to the player in the battle, block 710. The game console places the bonus icons in a row leading to the bonus area and displays (through the display device) the icons. In one implementation, the game console displays the bonus icons as shown in FIG. 3. Each bonus icon represents a bonus or type of bonus available to the player at the end of the battle and includes an image reflecting the corresponding bonus (e.g., an image of a coin for a money bonus). The game console selects which bonus icons to display and the order as described above (e.g., pseudo-randomly). The battle begins.

As time progresses in the battle, the game console moves the bonus icons along the action bar toward the bonus area, block 715. As described above, the game console moves the bonus icons into the bonus area one at a time, in "single file".

The game console detects when one of the bonus icons reaches the bonus area, block 720. The game console uses position information to detect the bonus icon reaching the bonus area. Alternatively, the game console uses timing information to determine when one of the bonus icons has reached the bonus area.

The game console removes the bonus icon that reached the bonus area, block 725. In one implementation, as a bonus icon enters the bonus area, the bonus area obscures the bonus icon (e.g., appears to be in front of the icon). When the icon has passed completely into the bonus area and so is no longer displayed, the game console has removed the bonus icon. In another implementation, the game console removes the bonus icon when the bonus icon initially contacts or partially enters the bonus area (e.g., using an animation). The game console displays an image (or symbol or text) in the bonus area reflecting the bonus icon that has just entered (e.g., displaying the same image as that of the bonus icon). In another implementation, the bonus area does not change.

The game console detects whether the battle is complete or not, block 730. The battle ends when all of the enemy characters (or all of the player characters) are defeated.

If the battle is not complete, the game console continues to move bonus icons along the action bar, returning to block 715, and perform actions as described above until the end of the battle.

When the battle is complete and if the player has won, the game console awards the player a bonus (or multiple bonuses) based on the state of the bonus icons, block 735. The game console selects a bonus for each of the bonus icons that have not yet entered the bonus area and are still displayed. In another implementation, the game console also selects a bonus for the bonus icon that last entered the bonus area. In another implementation, the game console selects a single bonus for the bonus icon that last entered the bonus area. As described above, the game console selects a bonus for a bonus icon according to the type of bonus indicated by the bonus icon, such as pseudo-randomly selecting an amount of money for a money bonus icon or pseudo-randomly selecting a particular item for an item bonus icon. In some implementations, the game console uses additional factors to influence the selection of a bonus, such as type of enemy defeated, point in the story of the game, location in the game, and so on. In another implementation, the bonus icons indicate a specific bonus, such as an amount of money, and the game console awards the indicated bonus. After selecting the bonus (or bonuses), the game console awards the selected bonus(es) to the player in the video game (e.g., adding the amount of money to the player's character's bank account).

The various implementations of the invention are realized in electronic hardware, computer software, or combinations of these technologies. Some implementations include one or more computer programs executed by a programmable processor or computer. For example, referring to FIG. 1, in one implementation, the game console 102 includes one or more programmable processors for executing application programs such as game software. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations using an information gauge in a battle in a video game, the information gauge can be used in various circumstances during a video game, such as minigames, races, or other time or sequence related events. In addition, rather than video games, other computer applications can also use an information gauge, such as meeting or project planners (showing anticipated arrival times and activity completions). Accordingly, the present invention is not limited to only those implementations described above.

what is claimed is:

1. A method of displaying information on a display device while executing a video game by a user, said video game having graphically displayed battle characters that perform battle actions in said video game, and said method being performed by a user-operated game console that executes a video game program to perform the steps comprising:

displaying a bonus area on a display screen;

displaying on said display screen a plurality of money or item bonus icons separate and apart from said battle characters, said bonus icons being displayed in a row ending at said bonus area, each bonus icon representing a money bonus or an item bonus award to the user;

moving said bonus icons over time towards said bonus area while said video game is being played and at a rate of movement depending upon the actions performed by said battle characters of said video game, so that said bonus icons enter said bonus area one at a time; and providing a player operating said game console a bonus corresponding to a bonus icon currently in said bonus area when an action concludes.

2. The method of claim 1, further comprising:

providing a player in the video game a bonus corresponding to each bonus icon that has not yet reached said bonus area when said action concludes.

3. The method of claim 1, wherein:

said bonus icons move at a rate related to the type of said action.

4. A computer program, stored on a tangible storage medium, for use in displaying information on a display device while a user executes a video game, said video game having graphically displayed battle characters that perform battle actions in said video game, the program comprising executable instructions that cause a computer to:

cause the display of a bonus area;

cause the display of a plurality of money or item bonus icons separate and apart from said battle characters, said bonus icons being displayed in a row ending at said bonus area, each bonus icon representing a money bonus or an item bonus award to the user ;

move said bonus icons over time towards said bonus area while said video game is being played and at a rate of movement depending upon the actions performed by said battle characters of said video game, so that said bonus icons enter said bonus area one at a time; and provide a player of the video game a bonus corresponding to a bonus icon currently in said bonus area when an action concludes.

5. A system for displaying information on a display device while executing a video game by a user said video game having graphically displayed battle characters that perform battle actions in said video game, comprising:

means for displaying a bonus area;

means for displaying a plurality of money or item bonus icons separate and apart from said battle characters, said bonus icons being displayed in a row ending at said bonus area, each bonus icon representing a money bonus or an item bonus award to the user;

means for moving said bonus icons over time towards said bonus area while said video game is being played and at a rate of movement depending upon the actions performed by said battle characters of said video game, so that said bonus icons enter said bonus area one at a time; and means for providing a player of the video game a bonus corresponding to a bonus icon currently in said bonus area when an action concludes.

* * * * *